Aug. 4, 1959    W. J. BLAZEK ET AL    2,897,582
METHOD OF PRODUCING A BALL-BEARING ASSEMBLY
Filed Nov. 8, 1955    3 Sheets-Sheet 1
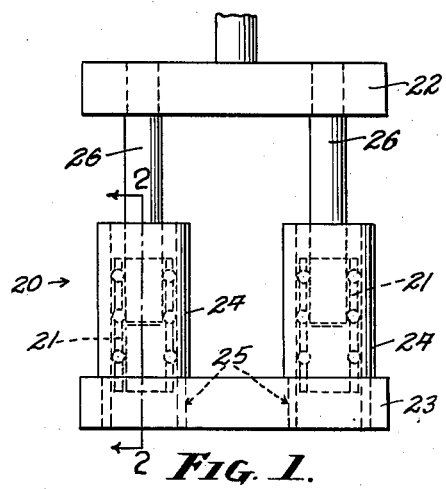
FIG. 1.
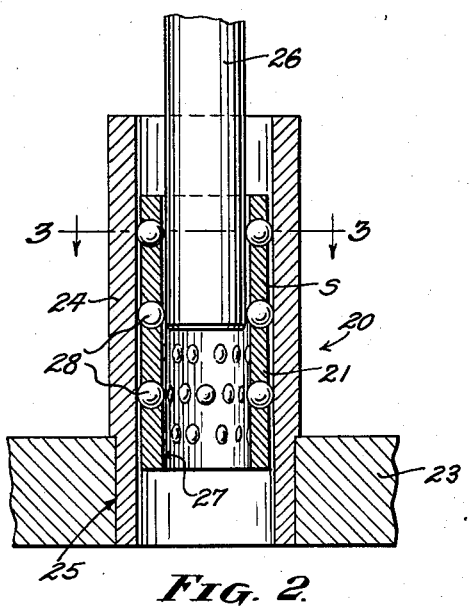
FIG. 2.
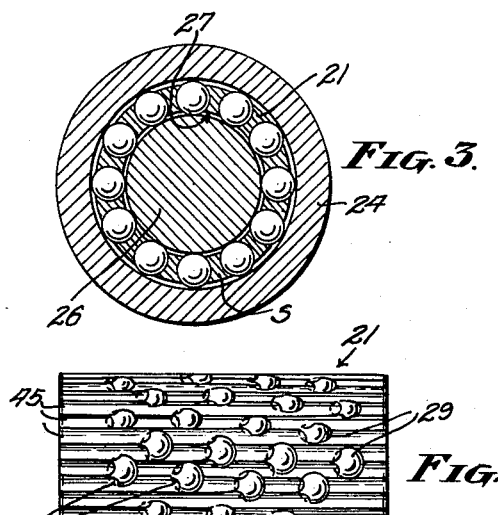
FIG. 3.
FIG. 12.
FIG. 4.
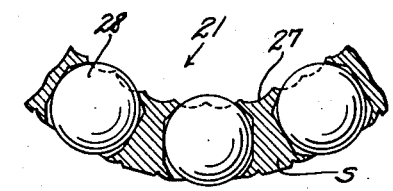
FIG. 13.
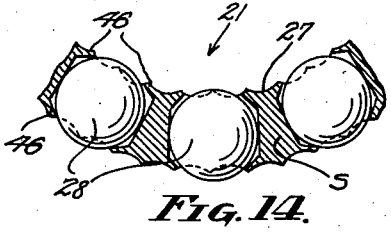
FIG. 14.
INVENTORS
W. J. Blazek
J. J. Strnad
BY W. J. Rambo
ATTORNEY

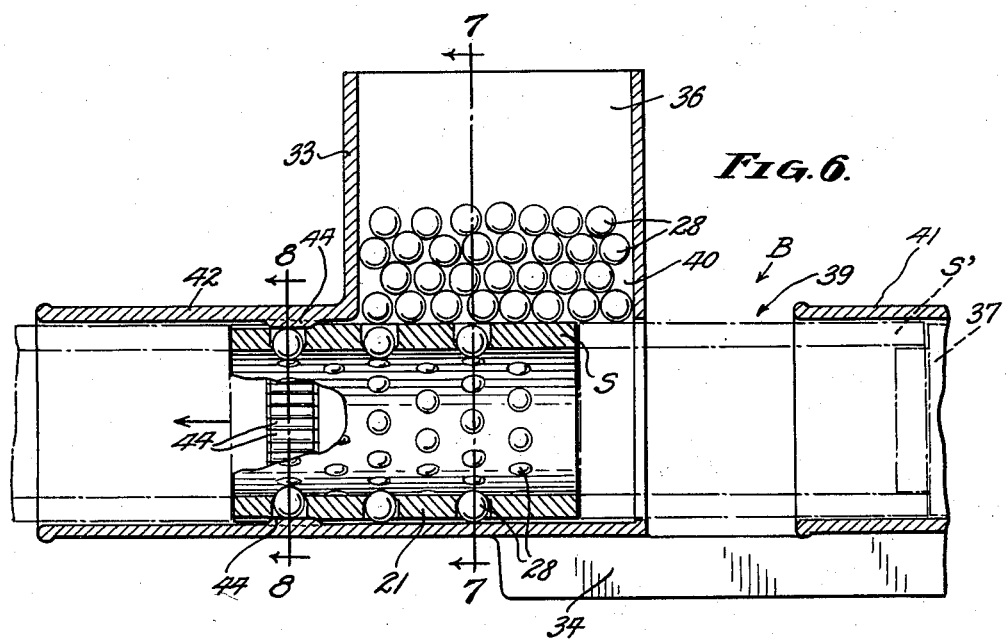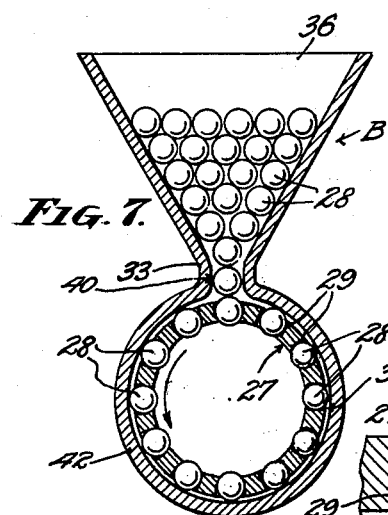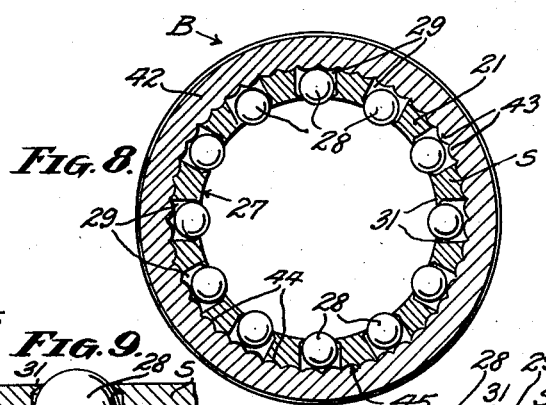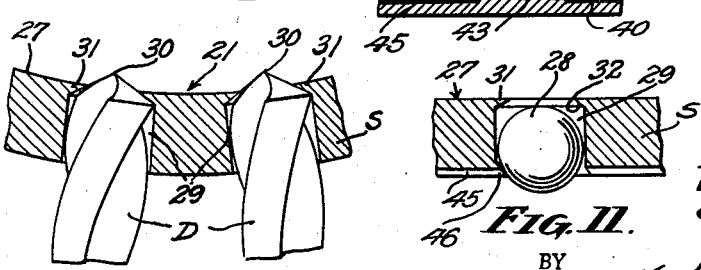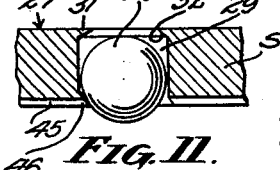
INVENTORS
W. J. Blazek
J. J. Strnad
BY
ATTORNEY INVENTORS
W. J. Blazek
J. J. Strnad

United States Patent Office 2,897,582
Patented Aug. 4, 1959

2,897,582

METHOD OF PRODUCING A BALL-BEARING ASSEMBLY

William J. Blazek, New Lexington, and James J. Strnad, Bedford, Ohio, assignors to Lempco Products, Inc., Bedford, Ohio, a corporation of Ohio Application November 8, 1955, Serial No. 545,696

3 Claims. (Cl. 29—148.4)

This invention relates to antifriction bearings and to an improved method for producing the same. More specifically, the invention has reference to bearings of the type utilizing cylindrical retainers having the walls thereof formed with a multiplicity of spaced openings for the reception and retention of associated bearing elements. The invention is especially concerned with an improved method for forming such openings so that the same will be enabled to movably receive and confine therein spherical bearing elements, and to the automatic positioning and retention of bearing elements in such openings.

Such bearings are adaptable for use in many different capacities in lieu of plain bearings, for example, in the guidance of the posts of die sets for punch presses, as shown in the patent of Conner, No. 2,422,774 of June 24, 1947. It will be understood, however, that many other practical applications of such bearings may and are being made. In the manufacture of such bearings, in quantity production, certain difficulties, delays and costs are involved in producing the same with present methods and appliances. Particularly is this true in the matter of depositing a ball element in each of the many openings provided for their reception in the sleeve-like retainer of the bearing. Also, in the operations of positively confining each element within its opening against displacement or loss.

It has been customary to deposit individually each ball element, usually by a manually performed operation in each retainer opening. Thereafter, upon such deposit, the retainer wall has been locally displaced by peening or staking operations adjacent each ball-containing opening, to confine permanently the ball elements in such openings. These operations, being largely individually performed on each opening and ball element, are slow and costly, and it will be appreciated that to obtain proper centering of the ball elements in said openings, so that when so mounted they will be enabled to turn freely, requires a high degree of attention, skill and care on the part of workers performing the operations.

A general object of the invention is to provide an improved method for simplifying and expediting the manufacture of cylindrical ball-bearing assemblies and reducing costs incident thereto.

Still another object is to provide an improved method for positioning and confining in each opening of such a cylindrical bearing retainer for freely rolling movement therein an antifriction ball element.

A still further object of the invention is to provide a bearing retainer of the type set forth, and method of forming the same, wherein, following loading of the openings of the retainer with bearing elements, the retainer is forced longitudinally through an annular grooving or staking die stationarily positioned in a cylindrical chamber of a bearing-depositing apparatus of the character above indicated, the die, upon the forced passage of a bearing-filled retainer therethrough, serving to groove or stake the outer surface of the retainer to displace the material of which the retainer is composed in forming fin-like projections or abutments for limiting outward movement of ball elements contained in said openings.

Another object of the invention is to provide a tubular antifriction ball bearing assembly of this character wherein longitudinal movement of the ball elements within their respective retainer openings, and between motion-limiting abutments disposed at the opposite ends of each of said openings, is provided, such movement enabling the ball elements to be engaged with said seats and removed from contact with the grooving or staking bights of an annular metal-displacing die when the retainers are undergoing longitudinal advancement through such a die.

For a more complete understanding of the present invention, reference may now be had to the following description and accompanying drawings, wherein:

Fig. 1 is a front elevational view disclosing the slidably interfitting posts and guides of a die set, and showing by broken lines the operating positions of ball-bearing assemblies formed in accordance with the present invention operatively positioned therein;

Fig. 2 is a detail vertical sectional view on the line 2—2 of Fig. 1;

Fig. 3 is a horizontal sectional view on the line 3—3 of Fig. 2;

Figure 15:
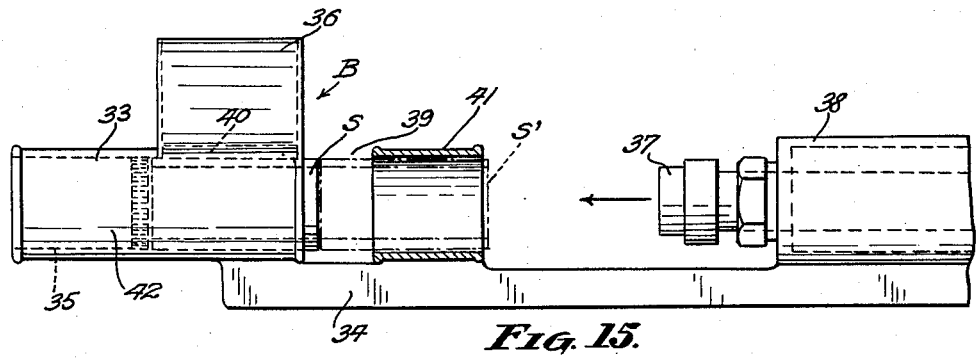
Figure 16:
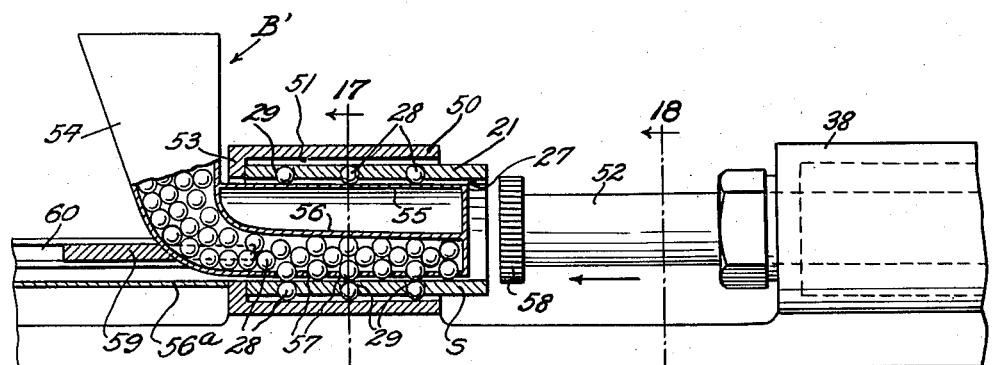
Figure 17:
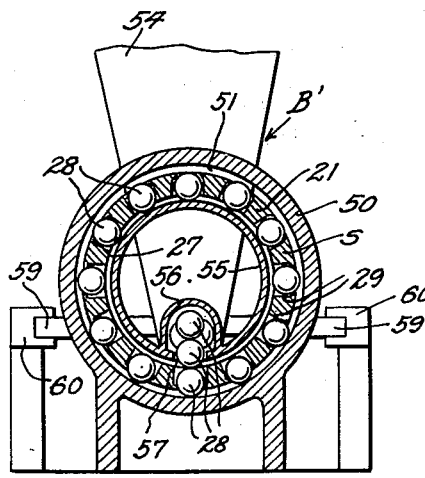
Figure 18:
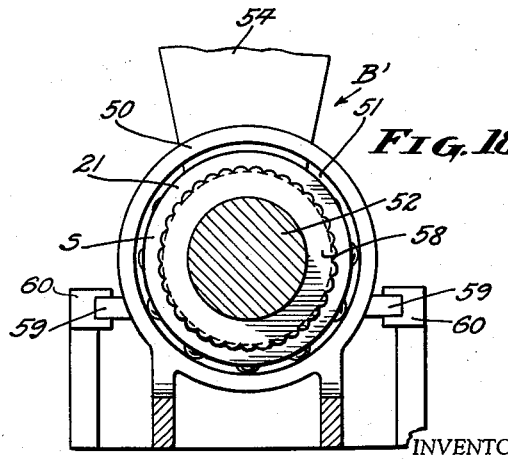

Fig. 4 is an enlarged fragmentary horizontal sectional view, disclosing in greater detail the formation of the ball-element-receiving openings of the bearing sleeve, the seating flanges at the inner ends of the openings and the projecting fins or abutments formed at the outer ends of the openings and effected through metal displacement produced by the action of a compressive grooving die on the outer surface of the sleeve;

Fig. 5 is a similar view, disclosing the drilling operation of forming spaced, radially extending, ball-element-receiving openings in the sleeve members of my improved bearing, and the seats formed for limiting motion of said elements at the inner ends of the drilled openings;

Fig. 6 is a vertical sectional view taken through apparatus for depositing ball elements in each of the openings provided therefor in the sleeve members of my improved bearing assembly;

Fig. 7 is a transverse vertical sectional view taken on the plane indicated by the line 7—7 of Fig. 6;

Fig. 8 is an enlarged vertical sectional view on the line 8—8 of Fig. 6 and disclosing the annular compression die positioned in the tubular loading chamber of the ball-depositing apparatus for scoring or grooving the outer surface of a sleeve passed therethrough in producing burr-like abutments at the outer ends of the element-receiving openings of the sleeve;

Fig. 9 is a detail vertical longitudinal sectional view on an enlarged scale disclosing the operation of the compression die in grooving or scoring the outer surface of a sleeve when forming the burr-like projections or abutments at the outer ends of the ball-element-receiving openings; in this figure the ball element is shown when in engagement with the inner seat and removed from contact with an associated bight of the forming die;

Fig. 10 is a similar view disclosing the ball element when operatively positioned in a midway position in a sleeve opening, and further disclosing the diameter of the element with respect to the thickness of the sleeve wall in enabling the element to project equidistantly beyond the inner and outer cylindrical surfaces of the sleeve;

Fig. 11 is a similar view disclosing the ball element when positioned on the burr or fin-like projections or abutments provided at the outer end of a sleeve opening and formed as a result of die-grooving and metal displacement of the outer surface of the sleeve;

Fig. 12 is a side elevational view of the sleeve showing its scored or longitudinally grooved outer surface;

Fig. 13 is a detail transverse sectional view taken through an alternate arrangement in which the cylindrical inner surface of a sleeve is grooved or scored longitudinally to provide abutments at the inner ends of the ball-element-retaining openings formed therein;

Fig. 14 is a similar view disclosing another modified form in which both the inner and outer concentric surfaces of a sleeve are scored or grooved;

Fig. 15 is a side elevational view, partly in vertical section of the ball-depositing and grooving apparatus;

Fig. 16 is a similar view taken through a modified form of said apparatus in which ball elements are introduced into the sleeve openings from the inner ends of said openings;

Fig. 17 is an enlarged vertical transverse sectional view taken on the line 17—17 of Fig. 16;

Fig. 18 is a similar view on the line 18—18 of Fig. 16.

Referring to the drawings by reference characters, there has been illustrated in Figs. 1 to 3 thereof, a punch and die set 20. This device is exemplary of one of many such devices to which the ball-bearing assemblies 21 of the present invention may be usefully applied. Therefore, the specific die set illustrated is to be considered merely as a means for facilitating an understanding of the invention and not by way of limitation thereof.

As here shown, the die set comprises the customary upper and lower holder plates 22 and 23, respectively, which may be adapted for attachment to the travelling cam or slide and the bed or bolster, respectively, of a conventional punch press. The base plate 23 is provided with a pair of guide bushings 24. The lower end of each of these bushings is shown as being shouldered and reduced in diameter, so that it may be driven in a bore 25 formed in the plate 23, and by which each bushing is maintained in a stationary upright position. The inner surfaces of these bushings may be formed to present smooth bores for the reception of the bearing assemblies 21 and of posts 26, the latter depending in rigid transversely spaced order from the upper holder plate 22 of the die set.

It will be seen that the posts 26 are spaced from the inner cylindrical surfaces 27 of the bearing retainers S through which the posts extend. Ball elements 28 are disposed in spaced, radial openings 29 formed transversely in the solid cylindrical wall of each retainer. Each of the ball elements possesses a greater diameter than the thickness of the wall in which it is mounted, so that said ball elements will be disposed in direct, antifriction, guiding engagement with the outer surfaces of the posts 26 and the inner surfaces of the bushings 24. It will be understood that the ball elements 28, and the retainers S in which they are mounted, do not extend the full length of each of the bushings 24. This is due to the fact that the ball elements or the retainers therefor travel vertically about one-half the distance of the movement of the associated post. Thus, the upper and lower parts of the die set may be maintained in perfect alignment, since no lateral movement is permitted during use because of the interposition of the sleeve-retained ball elements between the posts and cylinders.

The present invention is concerned primarily with the specific construction of the tubular antifriction bearing assemblies 21 and with an improved method for producing the same. As previously stated, it has been a common practice to perform manually and individually the operations of depositing the ball elements 28 in the retainer openings 29 formed for their reception, and to individually peen, stake or otherwise displace the retainer material around the ends of said openings to displace the same sufficiently to hold the ball elements in movably confined positions within the retainer openings.

To improve these manufacturing operations, each of the retainers S is transversely severed to desired length from elongated tubular stock. The several retainers, as shown in Fig. 5, are placed ordinarily in a drilling machine containing a plurality of radially movable, power rotated, drill bits D. With a retainer positioned in the center of such a drilling assembly, the rotating drill bits are adapted to be advanced inwardly and radially of a stationarily held retainer sleeve to drill simultaneously in the latter the ball-element-receiving openings 29, the latter being appropriately spaced around and longitudinally of the sleeve in offset relation with respect to each other.

In a preferred procedure used by the present invention, each drill D is formed with a conically tapering outer end 30. The drills are advanced inwardly and radially of an engaged retainer sleeve S, so that the openings 29 produced thereby will be formed with annular ball-abutment flanges 31 having inner conical ball-seating surfaces 32. The inner end of each of the openings 29, formed by so drilling the retainers, possesses a sufficient diameter to allow a segment of the ball element positioned therein to project beyond the cylindrical inner surface 27 of each sleeve for engagement with the outer surface of the post 26, or other equivalent machine part, and to limit inward, axial movement of the ball elements in said openings.

Following the formation of the openings 29 in said retainers, the latter, as shown in Figs. 6, 7 and 15, are positioned horizontally in a ball-element-depositing apparatus B. As here illustrated, this apparatus includes a casing 33 embodying a base 34, an elongated, tubular, retainer-receiving and advancing chamber 35 and a ball-element-containing hopper 36. The drilled retainers positioned in the chamber 35 are advanced longitudinally thereof in tandem order through the use of a fluid-operated ram 37, or its equivalent, the ram being slidably mounted for axial movement in a pressure cylinder 38 stationary on the base 34 in coaxial, longitudinally spaced, relation to the retainer chamber 35.

The wall structure of the retainer chamber, as here disclosed, is interrupted in its length to provide a retainer-manipulating space 39. This space is so positioned that a sleeve arranged in the chamber 35 beneath, and in immediately adjoining vertical registry with, an elongated narrow passage 40 formed between the element-receiving hopper 36 and the sleeve chamber, will project at the rear thereof into said space. This is done so that the projecting end of the retainer so positioned may be grasped and rotating forces applied thereto. In this manner each of the openings 29 is brought into registry with the passage 40 when the retainer containing the same is disposed in alignment with said passage and rotated about its longitudinal axis for a complete turn. The ball elements so deposited project beyond the unobstructed outer ends of the drill bores or openings 29, but are retained against displacement by the circularly disposed wall surfaces of the chamber 35.

After this ball loading or depositing operation has been completed, the ram 37 is actuated to force the ball-loaded retainer from its position of registry with the loading passage 40. In effecting such advancement, it will be noted that the outer end of the ram, as shown in Fig. 15, is disposed to engage with a drilled but ball-free retainer, as indicated at S', which is arranged for sliding movement in a positioning collar 41 carried by the base 34, said collar being disposed in alignment with the barrel 42 of the casing 33 in which the chamber 35 is formed. By this construction, the space 39 is provided, enabling the retainer sleeves positioned in the apparatus to be grasped for manipulation in effecting axial turning movement thereof.

To obstruct the outer ends of the drilled openings or bores 29 of the retainer S to limit radial outward movement of the ball elements in said openings or bores, the chamber 35 immediately beyond the passage 40 is formed with an annular, corrugated, die-forming region 43, the corrugations of said region producing a multiplicity of circularly arranged scoring and metal-displacing dies or bights 44.

As shown more particularly in Figs. 6, 9 and 12, as the individual retainers are forced through the die formation 43, the outer surface of each thereof is longitudinally grooved or scored, as indicated at 45, by the compressive action of the die bights 44. The parallel grooves or striae are closely related so that one or more of such grooves intersect the openings 29. At such intersections metal displaced by the grooving action of the die forms longitudinally projecting fins or abutments 46 which extend a sufficient distance across each of the bores or openings 29 to limit positively outward movement of the ball elements therein.

Thus instead of individually peening the walls of the openings 29 to produce the abutments 46, the operation herein disclosed enables the abutments to be formed in one pass of each retainer through the metal-displacing die. In these operations, hand work is virtually eliminated and a considerable saving thereby effected in both time and manufacturing costs. It will be noted that the openings or bores 29 are each of such length that when the retainers are forced through the annular die formation 43, the ball elements 28 are moved inwardly and longitudinally of the bores or openings 29 toward the seats 32, so that the ball elements are unaffected by the operation. As shown in Fig. 10, when the bearing assemblies as here formed are operatively positioned in a die set, the uniform thickness of the solid cylindrical wall of each retainer being less than the diameter of each ball element 28, a relationship is maintained in which segments of the ball elements will project beyond the inner surfaces 27 of the retainers and the grooved or scored outer surfaces 45. This relationship enables the ball elements to engage simultaneously the posts 26 of a die set and the inner surfaces of the guide cylinders 24, thereby maintaining these relatively movable parts in true relative order in all their operating positions.

The invention, of course, is subject to certain modification or procedure variation. For example, as shown in Fig. 13, the retainers S may be grooved or striated along the inner surfaces thereof to displace the material composing the same in producing the ball-retaining projections or abutments 46, while the outer surfaces thereof may be staked as previously defined. Also, if desired, as shown in Fig. 14, both the inner and outer cylindrical surfaces of the retainers may be grooved to produce the ball-abutment formations 46 at both ends of the ball-receiving bores 29.

In Figs. 16 through 18, another modification is disclosed wherein the ball elements 28 are deposited in the retainer openings from positions inside the retainers rather than outside the same, as heretofore described. In the ball-depositing apparatus of Fig. 16, the base of the apparatus includes a barrel-shaped housing 50 providing a loading chamber 51 which is open at the end facing the ram 52 and partly closed at its opposite end by a shoulder 53. With the ram 52 retracted, an unloaded retainer S may be positioned in the chamber 51 with its forward end in engagement with said shoulder, the rear part of the retainer projecting beyond said housing for turning manipulation.

With a retainer so positioned, a hopper unit is advanced from an inactive withdrawn position to an active position, as shown in Fig. 16. The hopper unit has been illustrated as comprising a receptacle 54 adapted for the reception of a considerable quantity of the ball elements 28. The lower portion of the receptacle terminates in a forwardly and longitudinally projecting tube extension 55 which is adapted to be disposed within a retainer S occupying the chamber 51. The extension is formed to include, as an integral part thereof, a horizontally and longitudinally extending conduit 56 which at one end thereof communicates openly with the lower part of the hopper receptacle 54, providing for the gravitational filling of the conduit with ball elements.

In the operation of this modified form of my invention, ball elements contained in the conduit are caused to pass through one or more longitudinally aligned channels 57 formed in the bottom of the tube extension 55, and, as an associated retainer S is axially turned, the ball elements drop into the retainer openings 29, so that each opening will receive a ball element. After such deposit, the ram 52 is advanced to cause an annular grooving or scoring die 58, rigid on its outer end, to enter the interior of the associated retainer to groove or score the inner cylindrical surface thereof in producing the ball-retaining abutments 46 across the inner ends of the retainer openings 29. In this operation, the hopper unit is moved outwardly of the chamber 51 from its inward ball-depositing position by engagement of the tube extension thereof with the outer end of the plunger 52. In slidably supporting the housing unit, the latter is provided with lateral projecting horizontal webs 59 having their outer edges received in recessed guides 60 arising stationarily from the base. When moved outwardly the conduit 56 engages a ball-confining table 56a to prevent spilling of balls from the channels 57.

In view of the foregoing, it will be evident that the present invention provides an improved method for quickly and accurately depositing a plurality of ball elements in a multiplicity of spaced openings formed for their reception in the cylindrical solid wall of a bearing retainer and, thereafter, to deform the metal or other body material of the retainer to produce the integral fin-like-extensions across the retainer openings to confine the deposited ball elements therein. It will, also, be noted that the ball elements and the length of the openings occupied thereby are such as to permit the ball elements to be moved longitudinally a limited distance in said openings to enable the ball elements to clear the bights of the forming dies as the grooving or scoring of the retainers takes place in producing the fin-like extensions shown at 46.

The retainers are usually formed from metal. However, it will be understood that other suitable materials may be used, such as wood, synthetic resins and many other compositions.

It will be understood that the invention may be further varied or modified, with respect to the specific disclosures herein defined, without departing necessarily from the spirit and scope of the invention expressed in the following claims.

We claim:

1. In the manufacture of a ball-bearing assembly, the method which comprises: forming a plurality of relatively spaced, substantially radially extending openings in the wall of a cylindrical, tubular bearing retainer; depositing in each of said openings a ball element; and thereafter grooving at least one of the cylindrical wall surfaces of said retainer along a multiplicity of relatively closely spaced, continuous lines to displace portions of the material of which said retainer is composed partially across an end of each of said openings and thereby form at said end of each of said openings an integral fin precluding accidental removal of a ball element from said end of the opening.

2. The method defined in claim 1, wherein the step of grooving is performed upon both the inner and outer cylindrical wall surfaces of said retainer to displace portions of the material from which said retainer is formed partially across both ends of said openings.

3. In the manufacture of a ball-bearing assembly, the steps which comprise: drilling a cylindrical, tubular bearing retainer to form therein a multiplicity of relatively spaced, radially arranged, ball-receiving bores each having a diametrically reduced opening at the inner cylindrical wall surface of said retainer; depositing a ball in each of said bores; and thereafter grooving the outer wall surface of said retainer along a multiplicity of relatively closely spaced, longitudinally coextensive lines to displace the material of which said retainer is composed partially across the ends of said bores opposite the diametrically reduced openings thereof and thereby form at the ends of said bores, adjacent the outer wall surface of said retainer, integral fins precluding accidental removal of said balls from said bores.

References Cited in the file of this patent

UNITED STATES PATENTS

| | | |
|---|---|---|
| 848,776 | Sisson | Apr. 2, 1907 |
| 883,469 | McKeel | Mar. 31, 1908 |
| 1,318,092 | Lockwood | Oct. 7, 1919 |
| 1,401,680 | Dlesk | Dec. 27, 1921 |
| 1,650,854 | Rouanet | Nov. 29, 1927 |
| 1,853,665 | Cramer | Apr. 12, 1932 |
| 1,915,288 | Bott | June 27, 1933 |
| 2,102,460 | Heim | Dec. 14, 1937 |
| 2,316,468 | Thomas | Apr. 13, 1943 |
| 2,407,016 | Kalister | Sept. 3, 1946 |
| 2,655,414 | Briney | Oct. 13, 1953 |